United States Patent
Chi

(10) Patent No.: US 7,783,184 B2
(45) Date of Patent: Aug. 24, 2010

(54) OPTICAL ZOOM TRACKING APPARATUS AND METHOD, AND COMPUTER-READABLE RECORDING MEDIUM FOR PERFORMING THE OPTICAL ZOOM TRACKING METHOD

(75) Inventor: Yong Seok Chi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 801 days.

(21) Appl. No.: 11/706,249

(22) Filed: Feb. 15, 2007

(65) Prior Publication Data

US 2008/0025711 A1 Jan. 31, 2008

(30) Foreign Application Priority Data

Feb. 15, 2006 (KR) .................. 10-2006-0014757
Nov. 21, 2006 (KR) .................. 10-2006-0114922

(51) Int. Cl.
G03B 17/00 (2006.01)
G03B 3/00 (2006.01)
G03B 13/00 (2006.01)
H04N 5/225 (2006.01)
H04N 7/12 (2006.01)
H04N 11/02 (2006.01)
H04N 11/04 (2006.01)

(52) U.S. Cl. .................. 396/80; 396/128; 348/169; 348/407.1; 382/118; 359/698

(58) Field of Classification Search .................. 396/80
See application file for complete search history.

(56) References Cited

U.S. PATENT DOCUMENTS 5,812,888 A * 9/1998 Kirigaya et al. .................. 396/80

| 6,047,136 A * | 4/2000 | Nakamura .................. 396/128 |
| 7,589,768 B2 * | 9/2009 | Morimoto .................. 348/240.1 |
| 2001/0048479 A1 * | 12/2001 | Ohkawara et al. .................. 348/360 |
| 2004/0189804 A1 * | 9/2004 | Borden et al. .................. 348/169 |
| 2005/0062885 A1 * | 3/2005 | Kadono et al. .................. 348/407.1 |
| 2007/0211351 A1 * | 9/2007 | Chi .................. 359/698 |

FOREIGN PATENT DOCUMENTS

| JP | 9-311265 A | 12/1997 |
| JP | 10-79880 A | 3/1998 |
| KR | 10-2004-0018229 | 3/2004 |
| KR | 10-2005-0037944 | 4/2005 |
| KR | 10-2005-0068004 | 7/2005 |
| KR | 10-2005-0108657 | 11/2005 |

* cited by examiner

*Primary Examiner*—Melissa J Koval
(74) *Attorney, Agent, or Firm*—Birch, Stewart, Kolasch & Birch, LLP

(57) ABSTRACT

In an optical zoom tracking apparatus and method, and a computer-readable recording medium for performing the optical zoom tracking, the optical zoom tracking apparatus commands a focus lens to move according to a continuous zooming operation, such that a clear image can be maintained while the image is continuously zoomed in or out, resulting in the effective use of limited power if an optical zoom function of a digital camera or mobile phone is executed. The optical zoom tracking apparatus includes: a zoom lens, a focus lens interoperable with the zoom lens, a zoom-lens drive moving the zoom lens, a focus-lens drive moving the focus lens, and a focus-lens controller for determining a moving distance of the focus lens according to a moving distance of the zoom lens, and transmitting a control signal corresponding to the moving distance of the focus lens to the focus-lens drive.

18 Claims, 6 Drawing Sheets

OPTICAL ZOOM TRACKING APPARATUS AND METHOD, AND COMPUTER-READABLE RECORDING MEDIUM FOR PERFORMING THE OPTICAL ZOOM TRACKING METHOD

This application claims the benefit of Korean Patent Application Nos. 10-2006-0014757, filed on Feb. 15, 2006, 10-2006-0114922, filed on Nov. 21, 2006, which is hereby incorporated by reference as if fully set forth herein.

BACKGROUND OF THE INVENTION

1. Field of the Invention

The present invention relates to an optical zoom lens system, and more particularly to an optical zoom tracking apparatus and method for use in the optical zoom lens system, and a computer-readable recording medium for performing the optical zoom tracking method.

2. Discussion of the Related Art

The optical zoom lens system has been widely mounted to a digital camera or digital VCR. Recently, the optical zoom lens system can also be mounted to a mobile phone or a portable multimedia player (PMP), etc. The above-mentioned optical zoom lens system can be implemented according to a variety of design methods. The most complicated design method of the optical zoom lens system may include at least 30 lens components and several mobile optical components as necessary.

However, the most basic method for designing the optical zoom lens system includes a lens or a lens group (hereinafter referred to as a "lens"), which are fixed at a specific location or be movable along an optical axis of the zoom lens system.

In the case of the above-mentioned optical zoom lens system, a focus plane of the optical zoom lens system moves from a current location to another location according to the variation of the magnifying power, such that there is a need to compensate for the movement of the focus plane in order to clearly maintain a focused image. The above-mentioned compensation of the focus-plane movement is executed by either a mechanical device capable of moving an overall lens assembly according to the magnifying power of the lens system or an optical device capable of adjusting a focus-plane location to maximally maintain the focus-plane location according to the zooming operation of the lens.

The optical zoom function for changing the magnifying power of the lens system can be implemented by moving from a current location to another location using a small-sized motor.

In other words, if the user enters a Wide-zooming signal or a Tele-zooming signal, the zoom lens moves by a drive motor. Therefore, a target-object image captured by a lens system of the camera module zooms in or zooms out, and at the same time a focal length changes. If the zoom lens moves from a current location to another location, a focus lens should be interoperable with the zoom lens, such that an in-focus status between the zoom lens and the focus lens can be maintained.

However, the above-mentioned conventional art has a disadvantage in that an unexpected defocusing problem occurs during the zooming operation of the zoom lens, resulting in the occurrence of a dim image.

And, the above-mentioned conventional art is unable to sufficiently provide the power required for implementing the optical zoom function. Therefore, in the case of a mobile phone equipped with the optical zoom lens system, a camera function is limited under the condition at least a predetermined amount of battery power has been consumed, the camera function may be limited, and the mobile phone may be compulsorily switched off during either the optical zoom tracking operation or the camera operation.

SUMMARY OF THE INVENTION

Accordingly, the present invention is directed to an optical zoom tracking apparatus, a method for controlling the optical zoom tracking apparatus, and a computer-readable recording medium for performing the optical zoom tracking method, that substantially obviate one or more problems due to limitations and disadvantages of the related art.

An object of the present invention is to provide an optical zoom tracking apparatus for maintaining a focus when continuously zooming in/out on/from a desired image by moving an optical zoom lens, a method for controlling the optical zoom tracking apparatus, and a computer-readable recording medium for performing the optical zoom tracking method.

Another object of the present invention is to provide an optical zoom tracking apparatus capable of providing an optical zoom function to effectively use a limited amount of power, a method for controlling the optical zoom tracking apparatus, and a computer-readable recording medium for performing the optical zoom tracking method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical zoom tracking apparatus comprises: a zoom lens which moves to adjust a magnification (i.e., a magnifying power) of a camera; a focus lens interoperable with the zoom lens; a zoom-lens drive for moving the zoom lens; a focus-lens drive for moving the focus lens; and a focus-lens controller for determining a moving distance of the focus lens according to a moving distance of the zoom lens, and transmitting a control signal corresponding to the moving distance of the focus lens to the focus-lens drive.

Preferably, the focus-lens controller further includes: a memory for storing a location value of the focus lens according to location information of the target object, in which the location value of the focus lens is in-focused according to a location of the zoom lens.

Preferably, the focus-lens controller further includes: an arithmetic unit for extracting at least two data from data stored in the memory, calculating the location value of the focus lens using the extracted two data, and determines the moving distance of the focus lens corresponding to the calculated location value.

Preferably, the calculation is executed by an interpolation.

The apparatus further comprises: a zoom-lens controller for receiving a zooming signal, and outputting a continuous zoom-lens moving signal to the zoom-lens drive.

Preferably, the apparatus further comprises: a battery lifetime detector for detecting the remaining amount of battery power indicating a battery lifetime, and generating a detection signal indicating the remaining battery lifetime; and a mode conversion unit for receiving the detection signal indicating the remaining battery lifetime, and transmitting a division tracking control signal to the controller.

In another aspect of the present invention, there is provided a method for controlling an optical zoom tracking comprising: a) receiving a zooming signal; b) continuously moving a zoom lens according to the zooming signal; c) determining a moving distance of a focus lens according to a location of a target object and a location of the zoom lens; and d) continuously moving the focus lens and the zoom lens according to the determined moving distance.

In yet another aspect of the present invention, there is provided a method for controlling an optical zoom tracking comprising: a) receiving a zooming signal, and detecting the remaining amount of battery power; and b) if the remaining amount of battery power is equal to or less than a predetermined amount of battery power, performing a division tracking mode for performing a zoom conversion at any one of magnifications contained in a zoom tracking area divided into N areas (where N is at least "2" on the basis of an optical magnification).

In yet another aspect of the present invention, there is provided a computer-readable recording medium comprising: a program for executing individual steps of the optical zoom tracking control method using a computer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that a zoom lens is indicative of a variator lens capable of adjusting a magnifying power of a camera, and a focus lens is indicative of a master- or compensator-lens for compensating for a focus dimmed by the zooming operation of the camera.

Figure 1:
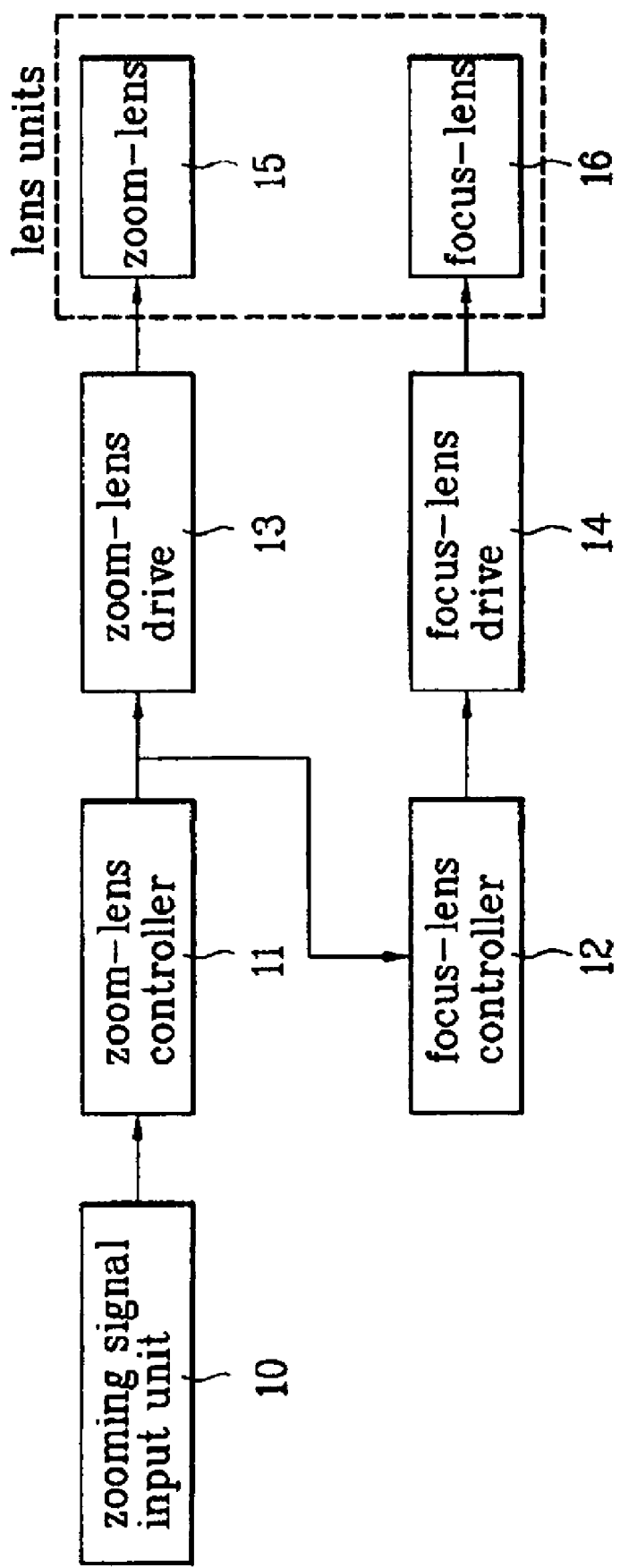
FIG. 1 is a block diagram illustrating an optical zoom tracking apparatus according to the present invention.

FIG. 1 is a block diagram illustrating an optical zoom tracking apparatus for a zoom camera module according to the present invention.

Referring to FIG. 1, a zoom camera module according to a preferred embodiment of the present invention includes a zooming-signal input unit 10, lens controllers 11 and 12, lens drivers 13 and 14, and lens units 15 and 16.

The optical zoom tracking apparatus receives a Wide- or Tele-signal capable of continuously magnifying (i.e., zoom-in) or reducing (i.e., zoom-out) an image of a target object to be captured from the zooming signal input unit 10. Upon receiving the above-mentioned zooming signal (i.e., Wide- or Tele-signal), the zoom-lens controller 11 determines a moving distance of the zoom lens, and outputs a drive signal corresponding to the determined moving distance.

The zoom-lens drive 13 moves the zoom lens 15 by a predetermined moving distance corresponding to the above-mentioned drive signal, such that the target-object image displayed on an image display (not shown) can be continuously magnified or reduced.

If the above-mentioned continuous zooming operation is executed by the zoom lens 15, the focus-lens controller 12 interoperable with the focus lens 16 outputs a control signal, such that the focus lens 16 can maintain an in-focus state. In this case, the moving distance of the focus lens 16 is determined by data stored in the focus-lens controller 12. The focus lens drive 14 receives the above-mentioned control signal, and moves the focus lens 16 by the above-mentioned moving distance of the focus lens. In this way, if the zoom lens 15 is continuously zoomed in or out by moving the zoom lens 15 itself, the focus lens 16 continuously moves along with the zoom lens 15, such that the in-focus state can be maintained and the continuous zoom tracking operations can be made available.

The method for determining the moving distance of the focus lens 16 will hereinafter be described.

Figure 2:
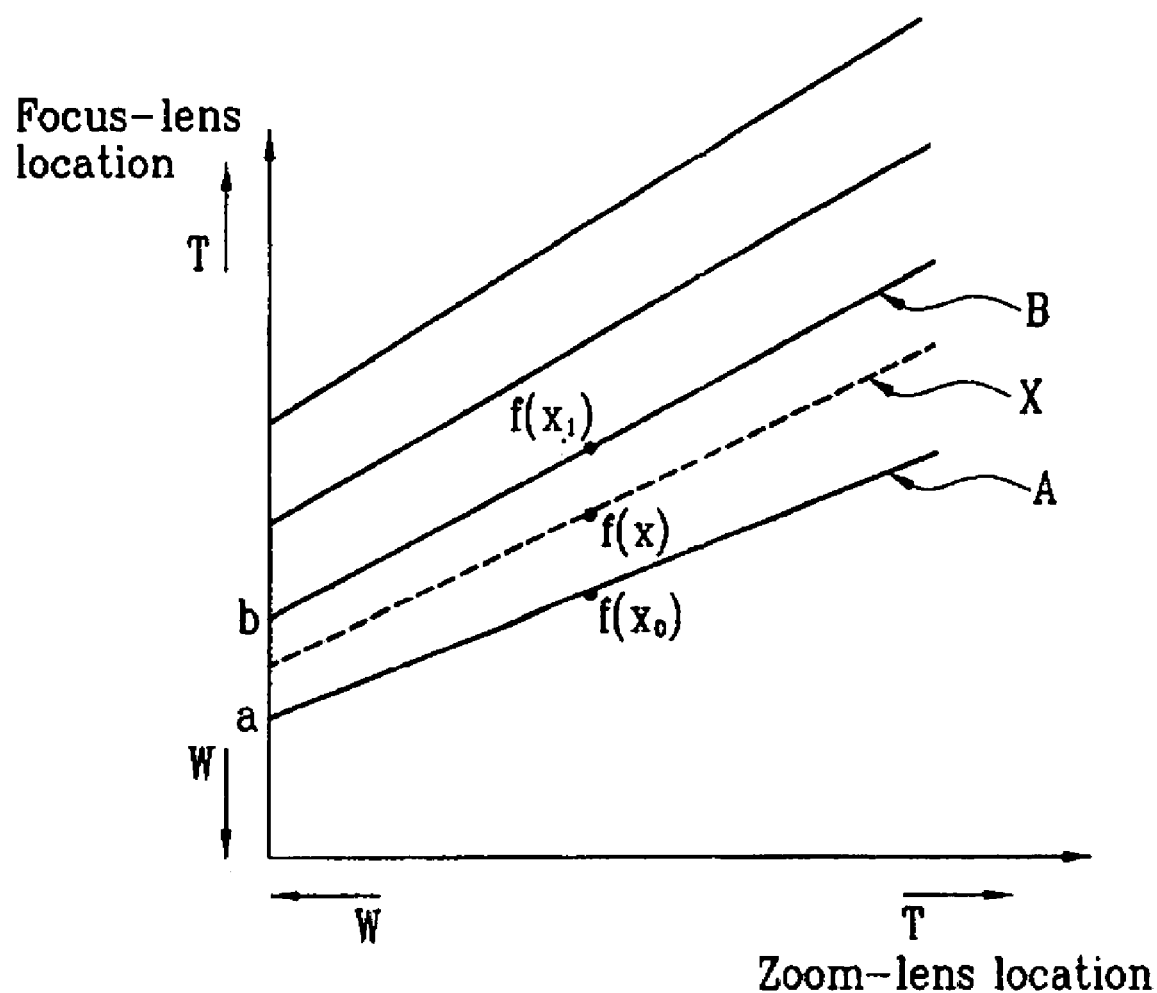
FIG. 2 is a conceptual diagram illustrating a method for calculating a moving distance of a focus lens of the optical zoom tracking apparatus shown in FIG. 1 according to the present invention.

FIG. 2 is a conceptual diagram illustrating a method for calculating a moving distance of a focus lens of the optical zoom tracking apparatus shown in FIG. 1 according to the present invention. In more detail, FIG. 2 is an exemplary graph illustrating a method for calculating the moving distance of the focus lens 16 of the optical zoom tracking apparatus of FIG. 1, and shows a correlation between the focus lens 16 and the zoom lens 15 according to the distance from the target object. As can be seen from FIG. 2, the focus-lens controller 12 determines a moving distance of the focus lens on the basis of constituent data of the graph. For this purpose, the focus-lens controller 12 may further include a memory (not shown) for storing the above data.

The "A" graph of FIG. 2 shows data of a target object located at an in-focus location under the condition that the zoom lens has the widest angle of view (i.e., a maximum Wide (W) signal) and the location value of the focus lens is set to "a". The above-mentioned target object is in focus when the zoom lens and the focus lens are located at the "A" graph. The "B" graph of FIG. 2 shows data of a target object located at an in-focus location under the condition that the zoom lens has the widest angle of view (i.e., a maximum Wide (W) signal) and the location value of the focus lens is set to "b". As can be seen from FIG. 2, the location values of the zoom lens and the focus lens are changed according to a distance between the target object and the camera module.

If the zoom lens 15 gradually moves according to the Tele-signal (T), an angle of view (i.e., a view angle) becomes narrower and the target-object image is gradually magnified.

In this case, in order to maintain the in-focus state, the location value of the focus lens 16 also increases. Therefore, if the focus lens 16 moves to an accurate location, the above-mentioned in-focus state can be maintained during the zooming process. For this purpose, the focus-lens controller calculates a moving-distance value of the focus lens 16, and outputs a signal corresponding to the calculated moving distance value.

The focus-lens controller 12 calculates the moving distance of the focus lens 16 according to data (i.e., constituent data of the above-mentioned graphs) stored in a memory (not shown). In the case of operating the camera having the continuous zooming device 100 according to the present invention, the zoom lens 15 is firstly located at a specific location at which a maximum view angle is acquired, and a focus is adjusted according to the distance from a target object.

Thereafter, if the user moves the zoom lens 15 from a current location to another location, the focus lens 12 automatically moves along with the zoom lens 15. In this case, if the distance from the target object reaches a specific value stored in the memory (not shown), the focus-lens controller 12 determines the moving distance of the focus lens 16 according to the value stored in the above-mentioned memory (not shown). In this case, the value stored in the memory moves along the line of the graphs of FIG. 2.

However, if the distance from the target object is not equal to the specific value stored in the memory, for example, if the in-focus state of the focus lens 16 is established when the focus lens 16 has a predetermined value between the "a" value and "b" value, a clear image of the target object cannot be maintained. In this case, in order to calculate an accurate location and a moving distance of the focus lens 16, the focus lens controller 12 further includes an additional arithmetic unit (not shown). Therefore, although the distance from the target object escapes from the range of data stored in the memory, the focus-lens controller 12 searches for a location value of the focus lens 16, and calculates the moving distance of the focus lens 16. A detailed description of the above-mentioned arithmetic unit will hereinafter be described.

As can be seen from FIG. 2, if the moving distance of the focus lens 16 escapes from the range of data contained in the graphs A and B, the focus-lens controller 12 can estimate a specific value "f(X)" using the values of two neighboring points $f(X_0)$ and $f(X_1)$. For this purpose, the focus-lens controller 12 selects two data values $f(X_0)$ and $f(X_1)$ nearest to data corresponding to not only the zoom-lens 15's location but also the location of a target object to be captured from among data stored in the memory. The focus-lens controller 12 calculates the estimated value f(X) on the basis of the above-mentioned two data values $f(X_0)$ and $f(X_1)$, such that it can calculate the moving distance of the focus lens 16, as represented by the following equation:

$$f(X) = f(X_0) + \frac{f(X_1) - f(X_0)}{X_1 - X_0}(X - X_0)$$ [Equation]

And, the focus lens 16 moves according to the above-mentioned estimated value, such that the in-focus state can be maintained during the continuous zoom tracking operation.

Figure 3:
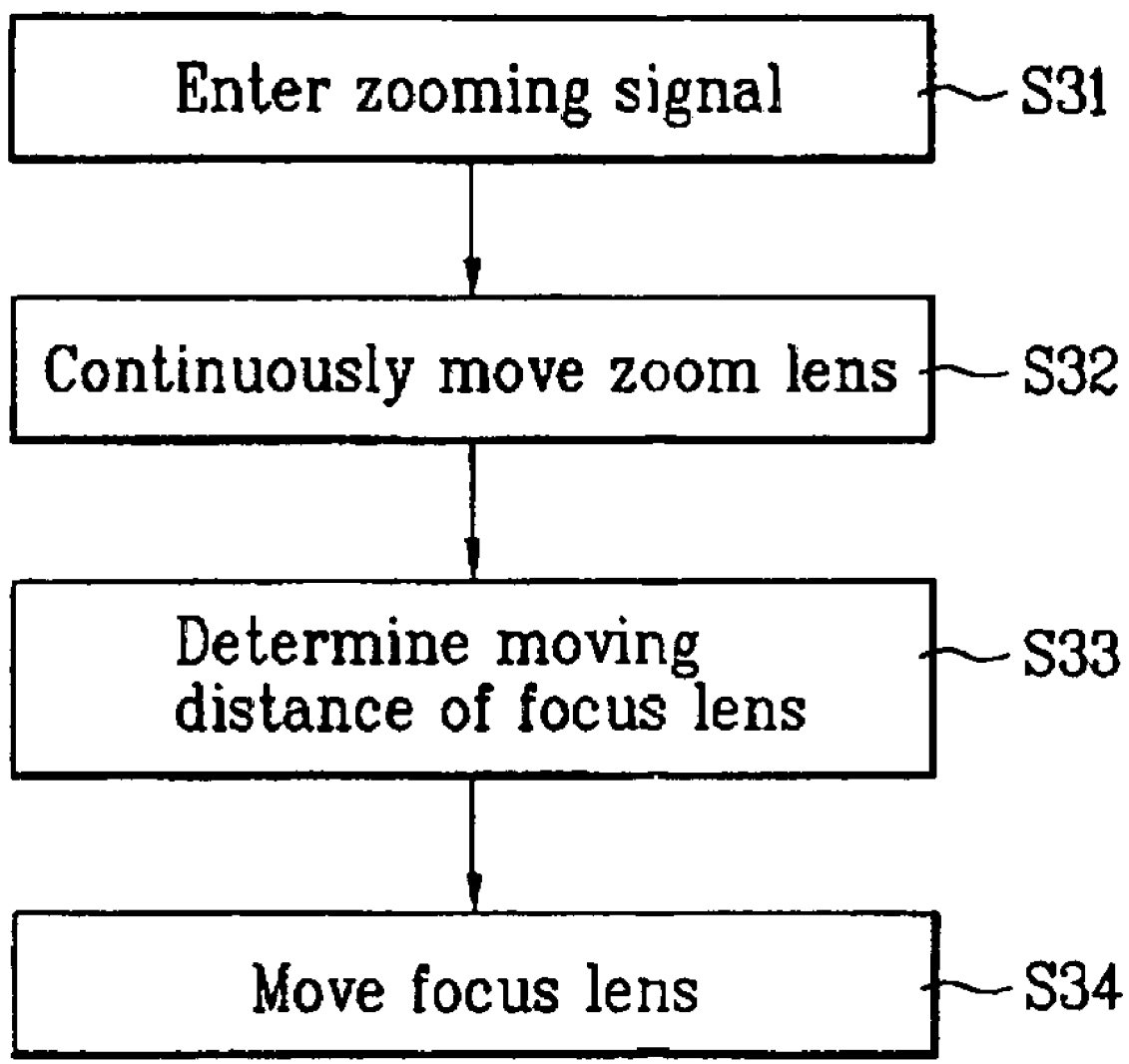
FIG. 3 is a flow chart illustrating a method for controlling the optical zoom tracking apparatus shown in FIG. 1 according to the present invention.

FIG. 3 is a flow chart illustrating a method for controlling the optical zoom tracking apparatus shown in FIG. 1 according to the present invention.

Referring to FIG. 3, the optical zoom tracking control method according to the present invention begins at a stage for receiving a zooming signal.

The optical zoom tracking apparatus receives a Wide- or Tele-signal capable of continuously magnifying (i.e., zoom-in) or reducing (i.e., zoom-out) an image of a target object to be captured from the zooming signal input unit 10 at step S31. Upon receiving the above-mentioned zooming signal (i.e., Wide- or Tele-signal), the zoom-lens controller 11 determines a moving distance of the zoom lens, and outputs a drive signal corresponding to the determined moving distance.

The zoom-lens drive 13 moves the zoom lens 15 by a predetermined moving distance corresponding to the above-mentioned drive signal at step S32, such that the target-object image displayed on an image display (not shown) can be continuously magnified or reduced.

If the above-mentioned continuous zooming operation is executed by the zoom lens 15, the focus-lens controller 12 interoperable with the focus lens 16 outputs a control signal, such that the focus lens 16 can maintain an in-focus state. For this purpose, the focus-lens controller 12 determines the moving distance of the focus lens 16 on the basis of the stored data at step S33, and a detailed description thereof has already been disclosed in FIG. 2.

The focus-lens drive 14 receives the above-mentioned control signal, and moves the focus lens 16 by a predetermined moving distance corresponding to the received signal at step S34. Therefore, the continuous zoom tracking method according to the present invention continuously moves the focus lens 16 in response to the continuous zooming operation, such that it can maintain the in-focus state.

Figure 4:
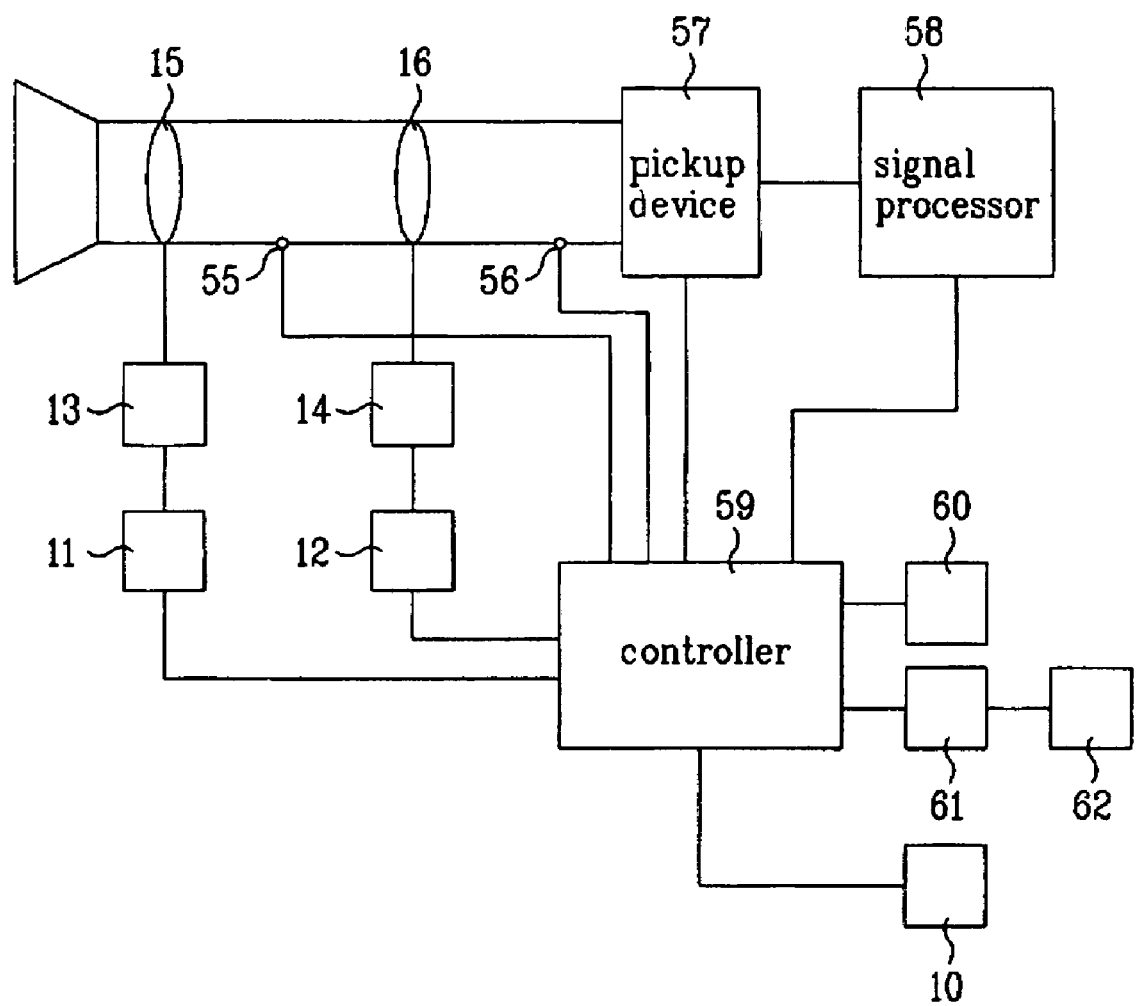
FIG. 4 is a block diagram illustrating a camera module equipped with the optical zoom tracking apparatus according to the present invention.

FIG. 4 is a block diagram illustrating a camera module equipped with the optical zoom tracking apparatus according to the present invention.

Referring to FIG. 4, the camera module according to the present invention receives an optical signal of the target object from the zoom lens 15 and the focus lens 16, and converts the received optical signal into a video signal via a pickup device 57. The video signal is converted into digital signal by a signal processor 58, such that the digital signal is displayed on a display (not shown), or is stored in a memory 60 according to a control signal of the controller 59.

The zoom lens 15 for adjusting the magnifying power of the camera moves by the zoom-lens drive 13 (i.e., a first stepping motor), and the focus lens 16 interoperable with the zoom lens 15 moves by the focus-lens drive 14 (i.e., a second stepping motor).

A drive signal of the zoom lens 15 is transmitted from the controller 59 to the motor controller 11. A drive signal of the focus lens 16 is transmitted from the controller 59 to the motor controller 12. The stepping motor 13 is driven by the output signal of the motor controller 11, and the stepping motor 14 is driven by the output signal of the motor controller 12.

The camera module of FIG. 4 further includes a first reset sensor 55 for detecting the location of the zoom lens 15 and a second reset sensor 56 for detecting the location of the focus lens 16, such that individual location signals of the zoom lens 15 and the focus lens 16 may be transmitted to the controller 59.

The locations of the zoom lens 15 and the focus lens 16 can be recognized by the output signals of the reset sensors 55 and 56 and the number of moving steps or cycles of the stepping motors 13 and 14.

If the magnifying power of the camera is adjusted by the movement of the zoom lens 15, the controller 59 generates a drive signal for moving the focus lens 16, such that the focus lens 16 moves according to the optical zoom lens system's zoom-tracking curve data pre-stored in the memory 60, which has been contained in the motor controllers 11 and 12 or is located at an external part. The memory 60 stores the zoom-tracking curve data, which is different according to the distance between the camera and the target object.

The zoom-camera module according to the present invention may further include a detector 62 for detecting the remaining power of a battery and a mode conversion unit 61.

The detector 62 for detecting the remaining power of a battery (i.e., a battery lifetime) detects the remaining power of the battery when the optical zooming function of a digital camera is activated, and transmits a signal indicating the detected battery lifetime to the mode conversion unit 61.

If it is determined that the battery lifetime corresponds to a predetermined amount of battery power, at which the optical zoom tracking operation cannot be performed, within the range of all areas of the optical zoom tracking curve, the mode conversion unit 61 commands the controller 59 to perform a division tracking mode.

In this case, the division tracking mode divides the optical zoom tracking curve into N areas (where N is at least "2" on the basis of the magnifying power), and allows a user to select a zoom magnifying power (i.e., a zoom magnification) of each area, such that the optical zoom magnifying power is changed to the user-selected magnifying power. For example, the following table shows a method for dividing the optical zoom mode area using the mode conversion unit 61 under the condition that the optical zoom magnifying power is set to three times magnification (i.e., "3×").

As can be seen from the above-mentioned Table, in the case of performing the division tracking mode, the optical zoom tracking apparatus according to the present invention may perform the selective zoom tracking method selected from among the Method 1 to the Method "n", instead of the full tracking mode for the overall zoom magnification areas.

For example, in the case of selecting the Method 2, the optical zoom tracking apparatus selects a plurality of zoom magnifying powers (i.e., zoom magnifying powers) contained in the Division Options 1~4, such that the zoom conversion is made available at only the selected magnifying powers.

The above-mentioned zoom magnification selection of individual areas may be selected by the user. However, provided that representative values of the N areas are pre-established, the zoom magnification may also be automatically selected during the division tracking mode. Also, during the above-mentioned zoom conversion process for implementing the selected magnifying power for each area, the zoom lens and the focus lens may be tracked along the original optical zoom tracking curve pre-stored in the memory.

However, in order to further reduce an amount of power consumption, it is preferable that the zoom and focus lenses may track along the shortest straight path between several locations contained in the zoom lens curve for individual magnifications. In the case of performing the above-mentioned division tracking mode, the optical zoom tracking

TABLE

| Zoom-lens location | Effective focal length (EFL) | Overall magnifying power | Method 1 | Method 2 | | Method n |
|---|---|---|---|---|---|---|
| (n) mm | (n') mm | 1.0 | Zoom magnification division option 1 | Zoom magnification division option 1 | ... | Zoom magnification division option 1 |
| (n) □a mm | (n') □a mm | 1.1 | | | | |
| (n) □b mm | (n') □b mm | 1.2 | | | | Zoom magnification division option 2 |
| (n) □c mm | (n') □c mm | 1.3 | | | | |
| (n) □d mm | (n') □d mm | 1.4 | | | | Zoom magnification division option 3 |
| (n) □e mm | (n') □e mm | 1.5 | | | | |
| (n) □f mm | (n') □f mm | 1.6 | | Zoom magnification division option 2 | | Zoom magnification division option 4 |
| (n) □g mm | (n') □g mm | 1.7 | | | | |
| (n) □h mm | (n') □h mm | 1.8 | | | | . |
| (n) □i mm | (n') □i mm | 1.9 | | | | . |
| (n) □j mm | (n') □j mm | 2.0 | | | | . |
| (n) □k mm | (n') □k mm | 2.1 | Zoom magnification division option 2 | Zoom magnification division option 3 | | |
| (n) □l mm | (n') □l mm | 2.2 | | | | |
| (n) □m mm | (n') □m mm | 2.3 | | | | Zoom magnification division option N-3 |
| (n) □n mm | (n') □n mm | 2.4 | | | | |
| (n) □o mm | (n') □o mm | 2.5 | | | | Zoom magnification division option N-2 |
| (n) □p mm | (n') □p mm | 2.6 | | Zoom magnification division option 4 | | |
| (n) □q mm | (n') □q mm | 2.7 | | | | Zoom magnification division option N-1 |
| (n) □r mm | (n') □r mm | 2.8 | | | | |
| (n) □s mm | (n') □s mm | 2.9 | | | | Zoom magnification division option N |
| (n) □t mm | (n') □t mm | 3.0 | | | | | apparatus according to the present invention may use only some methods from among the Methods 1~N according to the battery lifetime.

Figure 5:
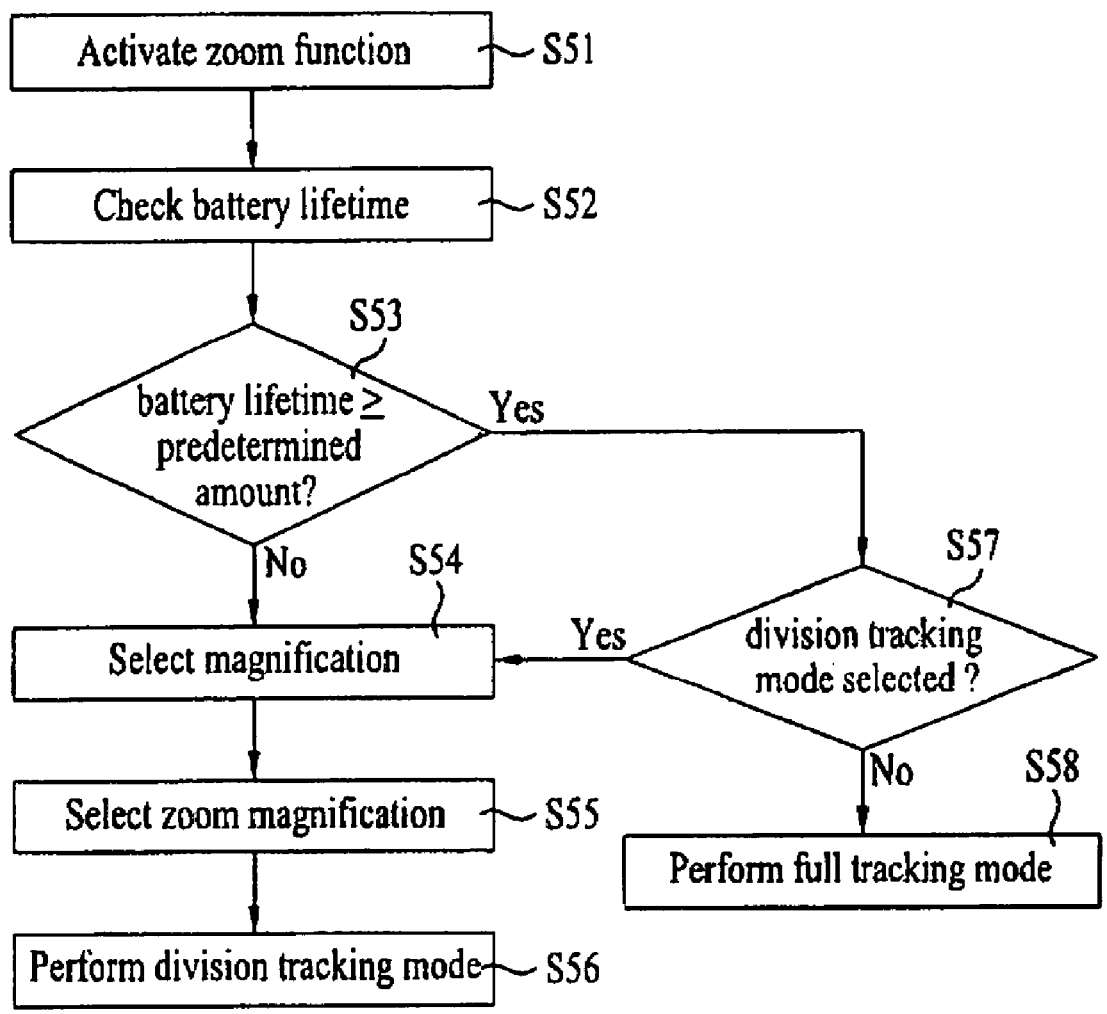
FIG. 5 is a flow chart illustrating an optical zoom tracking control method of the camera module shown in FIG. 4 according to the present invention.

FIG. 5 is a flow chart illustrating an optical zoom tracking control method of the camera module shown in FIG. 4 according to the present invention.

Referring to FIG. 5, if the user operates or selects an optical zoom function using either a digital camera equipped with an optical zoom function or a mobile phone having the optical zoom function at step S51, the optical zoom tracking apparatus detects the remaining power of a battery (i.e., a battery lifetime) of the digital camera or mobile phone at step S52.

If it is determined that the battery lifetime corresponds to a predetermined amount of battery power or less, at which the optical zoom tracking operation cannot be performed, within the range of all areas of the optical zoom tracking curve at step S52, the controller 59 performs the division tracking mode at steps S53, S54, S55, and S56.

Otherwise, if it is determined that the battery lifetime does not reach the predetermined amount of battery power or less within the range of all areas of the optical zoom tracking curve at step S52, the controller 59 commands the user to determine any one of the overall zoom lens mode and the division zoom tracking mode at steps S53 and S57.

If the battery lifetime corresponds to a predetermined amount of battery power at which the full tracking mode can be executed, or if the division tracking mode is selected by the user, the user may directly select a magnifying power of each area or predetermined magnifying powers are selected at step 54.

In this case, although only the predetermined amount of battery power is detected, the optical zooming function can be sufficiently executed at the overall optical zoom tracking area using the detected battery power. The current received from a battery (not shown) or an internal voltage of the battery is indicative of an analog signal.

The analog signal is detected by the battery-power detector 61, and it is converted into a digital signal, such that the digital signal is generated in the form of a signal for detecting the remaining battery power.

The mode conversion unit 62 receives the remaining battery power detection signal from the detector 61, compares the remaining amount of a battery current with a total amount of a battery current, and changes the remaining battery current into a percentage value (%) on the basis of the total amount of battery current. If it is determined that the percentage value (%) is equal to or less than 50%, the mode conversion unit 62 transmits a division tracking control signal to the controller 59.

The optical zoom tracking apparatus selects the moving resolution (i.e., zoom tracking resolution) of the zoom lens 15 and the moving resolution (i.e., zoom tracking resolution) of the focus lens 16 according to the selected magnifying power at step S55. In this case, a method for dividing the zoom tracking area into four areas is exemplarily shown in FIG. 6.

Figure 6:
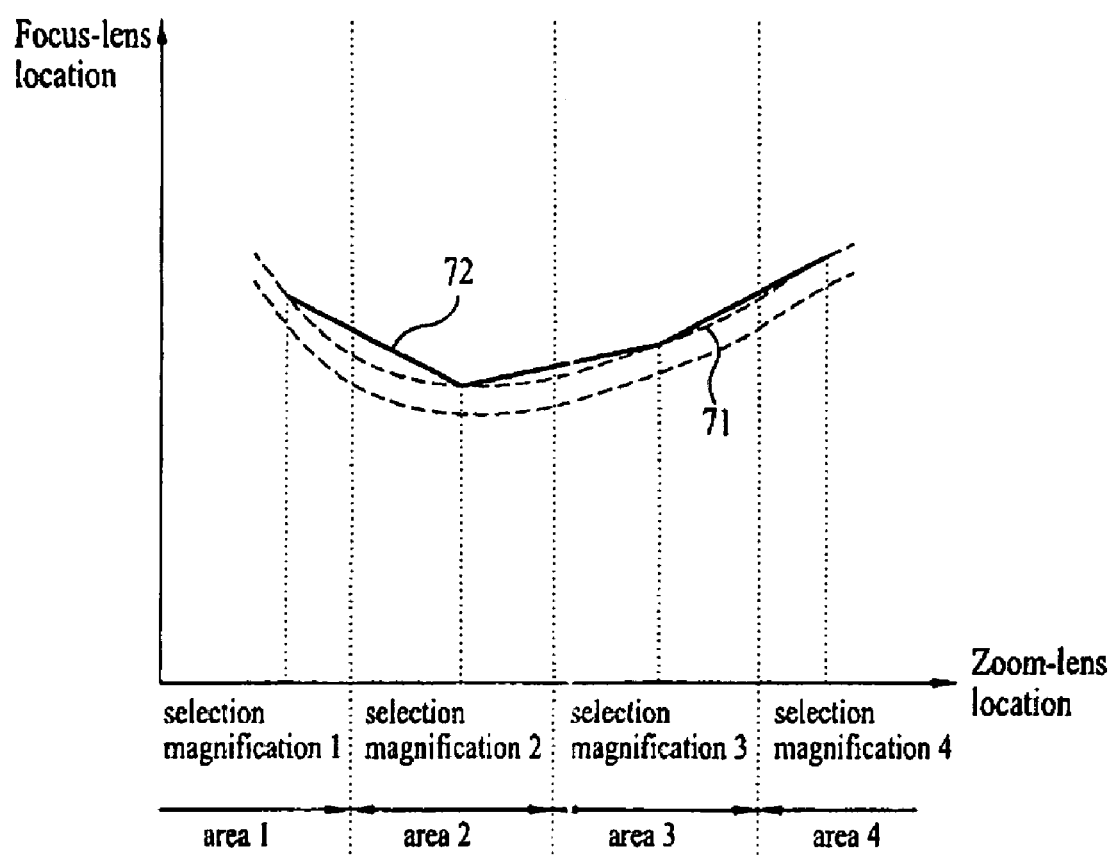
FIG. 6 is a conceptual diagram illustrating a method for selecting a zoom-tracking resolution using the optical zoom tracking control method shown in FIG. 5 according to the present invention.

FIG. 6 is a conceptual diagram illustrating a method for selecting a zoom-tracking resolution using the optical zoom tracking control method shown in FIG. 5 according to the present invention.

Referring to FIG. 6, it is preferable that the variator lens and the master lens move along the zoom tracking curve 72, which has been converted to acquire the shortest straight distance between locations of the original zoom tracking curve 71 of 4 selection magnifications (i.e., selection magnifications 1~4)

Needless to say, provided that the variator lens and the master lens are required to follow the original zoom tracking curve associated with the target-object distance pre-stored in the memory during the zooming process in the same manner as in a digital VCR, the zoom conversion between the selected magnifications may also follow the original zoom tracking curve as necessary.

In the meantime, provided that the battery lifetime corresponds to a predetermined amount of battery power at which the full tracking mode can be executed, and the full tracking mode is executed by the user, the zoom tracking function is performed according to the original zoom tracking curve 71 depending on the distance from the target object at step S58.

The above-mentioned optical zoom tracking control method according to the present invention can also be implemented with codes stored in a computer-readable recording medium. The computer-readable recording medium includes all kinds of recording devices, each of which stores computer-readable programs or data, for example, a ROM, a RAM, a CD-ROM, a magnetic tape, a HDD, a floppy disc, a flash memory, and an optical-data storage unit.

In this case, the program stored in the recording medium indicates series of command data capable of being directly or indirectly used in an information processing device (e.g., a computer) for acquiring specific resultant data. Therefore, the computer includes all kinds of devices, each of which includes a memory, an I/O (Input/Output) unit, and an arithmetic control unit, etc., and has information processing capacity for performing a specific function.

As apparent from the above description, in the case where the optical zoom function of the digital camera or mobile phone is executed, the optical zoom tracking apparatus or method according to the present invention commands the focus lens to move according to the continuous zooming operation, such that a clear image can be maintained while the image is continuously zoomed in or out.

The present invention estimates an accurate focus-lens location value corresponding to not only the target object location but also the zoom-lens location, and moves the focus lens using the estimated location value, such that it can maintain an accurate focus.

In the case of performing the optical zoom function of the digital camera or mobile phone, the present invention selectively changes the optical zoom magnification and the zoom tracking resolution according to the remaining amount of battery power, performs the optical zoom function irrespective of the remaining amount of battery power. As a result, the present invention can solve the problem of the conventional art, which has been designed to restrict camera functions when the remaining amount of battery power reaches a predetermined amount, without using a large-capacity battery.

Although the present invention has been mainly disclosed on the basis of a digital camera, it should be noted that the scope of the present invention is not limited to the above-mentioned digital camera, and can also be applied to all kinds of optical zooming products (e.g., mobile phones or potable multimedia displays).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical zoom tracking apparatus comprising:
   a zoom lens which moves to adjust a magnification of a camera;
   a focus lens interoperable with the zoom lens;

a zoom-lens drive for moving the zoom lens;
a focus-lens drive for moving the focus lens; and
a focus-lens controller for determining a moving distance of the focus lens according to a moving distance of the zoom lens, and transmitting a control signal corresponding to the moving distance of the focus lens to the focus-lens drive;
the focus-lens controller including:
an arithmetic unit for extracting at least two data from data, calculating the location value of the focus lens using the extracted two data, and determining the moving distance of the focus lens corresponding to the calculated location value,
wherein the calculation is executed by an interpolation.

2. The apparatus according to claim 1, wherein the focus-lens controller further includes:
a memory for storing a location value of the focus lens according to location information of the target object, in which the location value of the focus lens is in-focused according to a location of the zoom lens.

3. The apparatus according to claim 2, wherein
the arithmetic unit extracts the at least two data from data stored in the memory.

4. The apparatus according to claim 1, further comprising:
a zoom-lens controller for receiving a zooming signal, and outputting a continuous zoom-lens moving signal to the zoom-lens drive.

5. An optical zoom tracking apparatus comprising:
a zoom lens which moves to adjust a magnification of a camera;
a focus lens interoperable with the zoom lens;
a zoom-lens drive for moving the zoom lens;
a focus-lens drive for moving the focus lens;
a focus-lens controller for determining a moving distance of the focus lens according to a moving distance of the zoom lens, and transmitting a control signal corresponding to the moving distance of the focus lens to the focus-lens drive;
a battery lifetime detector for detecting the remaining amount of battery power indicating a battery lifetime, and generating a detection signal indicating the remaining battery lifetime; and
a mode conversion unit for receiving the detection signal indicating the remaining battery lifetime, and transmitting a division tracking control signal to the controller.

6. A method for controlling an optical zoom tracking, comprising:
a) receiving a zooming signal;
b) continuously moving a zoom lens according to the zooming signal;
c) determining a moving distance of a focus lens according to a location of a target object and a location of the zoom lens;
d) continuously moving the focus lens and the zoom lens according to the determined moving distance;
e) detecting the remaining amount of battery power indicating a battery lifetime;
f) generating a detection signal indicating the remaining battery lifetime;
g) receiving the detection signal indicating the remaining battery lifetime; and
h) transmitting a division tracking control signal to a controller.

7. The method according to claim 6, wherein the step c) for determining the moving distance of the focus lens includes:
extracting at least two data from data stored in a memory;
calculating a location value of the focus lens using the extracted two data; and
determining the moving distance of the focus lens corresponding to the calculated location value of the focus lens.

8. A method for controlling an optical zoom tracking, comprising:
a) receiving a zooming signal, and detecting the remaining amount of battery power;
b) comparing the remaining amount of battery power to a predetermined amount of battery power; and
c) performing a division tracking mode for performing a zoom conversion at any one of magnifications contained in a zoom tracking area divided into N areas, where N is at least "2" on the basis of an optical magnification, if the remaining amount of battery power is equal to or less than the predetermined amount of battery power.

9. The method according to claim 8, further comprising:
performing an optical zooming function at either a full tracking mode or the division tracking mode, in which the full tracking mode performs the optical zooming function in a full range of the zoom tracking area, if the remaining amount of battery power is equal to or higher than the predetermined amount of battery power.

10. The method according to claim 8, further comprising selecting any one of magnifications contained in the divided zoom tracking area.

11. The method according to claim 8, further comprising moving the zoom tracking at the division tracking mode along the shortest straight distance between locations contained in an optical zoom tracking curve of each selected magnification.

12. The method according to claim 8, further comprising selecting the predetermined amount of battery power to allow an optical zooming function to be sufficiently executed in the full range of the optical zoom tracking area.

13. A non-transitory computer-readable recording medium encoded with a program for executing the following steps:
a) receiving a zooming signal, and detecting the remaining amount of battery power;
b) comparing the remaining amount of battery power to a predetermined amount of battery power; and
c) performing a division tracking mode for performing a zoom conversion at any one of magnifications contained in a zoom tracking area divided into N areas, where N is at least "2" on the basis of an optical magnification, if the remaining amount of battery power is equal to or less than the predetermined amount of battery power.

14. The non-transitory computer-readable recording medium of claim 13 the steps further comprising:
performing an optical zooming function at either a full tracking mode or the division tracking mode, in which the full tracking mode performs the optical zooming function in a full range of the zoom tracking area, if the remaining amount of battery power is equal to or higher than the predetermined amount of battery power.

15. The non-transitory computer-readable recording medium of claim 13 the steps further comprising:
selecting any one of magnifications contained in the divided zoom tracking area.

16. The non-transitory computer-readable recording medium of claim 13 the steps further comprising:
moving the zoom tracking at the division tracking mode along the shortest straight distance between locations contained in an optical zoom tracking curve of each selected magnification.

17. The non-transitory computer-readable recording medium of claim 13 the steps further comprising:
   selecting the predetermined amount of battery power to allow an optical zooming function to be sufficiently executed in the full range of the optical zoom tracking area.

18. A method for controlling an optical zoom tracking, comprising:
   receiving a zooming signal;
   continuously moving a zoom lens according to the zooming signal;
   determining a moving distance of a focus lens according to a location of a target object and a location of the zoom lens;
   continuously moving the focus lens and the zoom lens according to the determined moving distance;
   controlling the focus-lens by storing a location value of the focus lens in a memory according to location information of the target object, in which the location value of the focus lens is in-focused according to the location of the zoom lens;
   extracting at least two data from data stored in the memory; and
   calculating by an interpolation the location value of the focus lens using the extracted two data, and determining the moving distance of the focus lens corresponding to the calculated location value.

* * * * *